(12) United States Patent
Dahlfort et al.

(10) Patent No.: US 8,929,738 B2
(45) Date of Patent: Jan. 6, 2015

(54) RESILIENCE IN AN ACCESS SUBNETWORK RING

(75) Inventors: Stefan Dahlfort, Santa Clara, CA (US); Ming Xia, Milpitas, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 25 days.

(21) Appl. No.: 13/484,115

(22) Filed: May 30, 2012

(65) Prior Publication Data

US 2013/0322883 A1    Dec. 5, 2013

(51) Int. Cl.
*H04J 14/02*    (2006.01)

(52) U.S. Cl.
USPC ............ 398/83; 398/79; 398/59; 398/48; 398/49; 398/85; 398/87; 385/24; 385/37; 385/16; 385/17; 385/18

(58) Field of Classification Search
USPC ............ 398/83, 79, 58, 3, 5, 7, 8, 45, 48, 50, 398/82, 85, 87, 49, 59; 385/24, 16, 17, 18, 385/37
See application file for complete search history.

(56) References Cited

U.S. PATENT DOCUMENTS

| | | | |
|---|---|---|---|
| 4,809,362 A | 2/1989 | Claus et al. | |
| 5,301,053 A | 4/1994 | Shikada | |
| 6,067,288 A | 5/2000 | Miller et al. | |
| 6,493,117 B1 * | 12/2002 | Milton et al. | .......... 398/49 |
| 6,567,429 B1 | 5/2003 | DeMartino | |
| 6,633,695 B2 | 10/2003 | Bailey et al. | |
| 6,687,463 B1 | 2/2004 | Hutchison et al. | |
| 6,754,403 B1 | 6/2004 | Schmid | |
| 7,024,116 B2 | 4/2006 | Orbach et al. | |
| 7,181,095 B1 * | 2/2007 | Meli et al. | .......... 385/11 |
| 7,200,331 B2 | 4/2007 | Roorda et al. | |
| 7,483,636 B2 * | 1/2009 | Aoki et al. | .......... 398/83 |

(Continued)

FOREIGN PATENT DOCUMENTS

| | | |
|---|---|---|
| EP | 1703762 A2 | 9/2006 |
| WO | WO 00/76105 A1 | 12/2000 |

(Continued)

OTHER PUBLICATIONS

Strasser, et al. "Wavelength-Selective Switches for ROADM Applications", IEEE J. of Sel. Topics in Quant. El., V. 16, N. 5, Sep./Oct. 2010, the whole document.

(Continued)

*Primary Examiner* — Hanh Phan

(57) ABSTRACT

Embodiments herein include a resilient add-drop module for use in one of multiple access subnetwork nodes forming an access subnetwork ring. The module comprises a dual-arm passive optical filter and a cyclic arrayed waveguide grating (AWG). The dual-arm passive optical filter is configured to resiliently drop any wavelength channels within a fixed band uniquely allocated to the access subnetwork node from either arm of the access subnetwork ring and to resiliently add any wavelength channels within the fixed band to both arms of the access subnetwork ring. The cyclic AWG is correspondingly configured to demultiplex wavelength channels dropped by the dual-arm filter and to multiplex wavelength channels to be added by the dual-arm filter. Configured in this way, the module in at least some embodiments advantageously reduces the complexity and accompanying cost of nodes in an optical network, while also providing resilience against fiber and node failures.

16 Claims, 15 Drawing Sheets

(56) References Cited

U.S. PATENT DOCUMENTS

| | | | |
|---|---|---|---|
| 7,546,043 | B2 | 6/2009 | Kai et al. |
| 7,599,620 | B2 | 10/2009 | Graves et al. |
| 7,657,181 | B2 | 2/2010 | Terai et al. |
| 7,860,396 | B2 * | 12/2010 | Claringburn et al. ........... 398/83 |
| 8,521,024 | B2 | 8/2013 | Wellbrock et al. |
| 8,693,880 | B2 | 4/2014 | Sakauchi et al. |
| 2001/0046350 | A1 | 11/2001 | Tedesco |
| 2001/0051019 | A1 | 12/2001 | Bailey et al. |
| 2002/0191250 | A1 | 12/2002 | Graves et al. |
| 2004/0141746 | A1 | 7/2004 | Oberg |
| 2004/0153492 | A1 | 8/2004 | Cao et al. |
| 2004/0197099 | A1 | 10/2004 | Kai et al. |
| 2004/0212897 | A1 | 10/2004 | Tedesco |
| 2005/0084262 | A1 | 4/2005 | Oberg et al. |
| 2005/0259571 | A1 | 11/2005 | Battou |
| 2005/0275921 | A1 | 12/2005 | Haus et al. |
| 2006/0110162 | A1 | 5/2006 | Tian et al. |
| 2006/0275034 | A9 | 12/2006 | Way et al. |
| 2007/0212068 | A1 | 9/2007 | Miyazaki et al. |
| 2008/0013950 | A1 | 1/2008 | Boudreault et al. |
| 2008/0044184 | A1 | 2/2008 | Popovic |
| 2008/0317466 | A1 | 12/2008 | Chung et al. |
| 2009/0047019 | A1 | 2/2009 | Palacharla et al. |
| 2009/0220228 | A1 | 9/2009 | Popovic |
| 2010/0014859 | A1 | 1/2010 | D'Alessandro et al. |
| 2010/0209038 | A1 | 8/2010 | Popovic et al. |
| 2011/0135305 | A1 | 6/2011 | Barnard |
| 2011/0236021 | A1 | 9/2011 | Presi et al. |
| 2011/0274425 | A1 | 11/2011 | Grobe |
| 2012/0183294 | A1 | 7/2012 | Boertjes et al. |
| 2012/0201541 | A1 | 8/2012 | Patel et al. |
| 2012/0251117 | A1 | 10/2012 | Patel et al. |
| 2013/0243416 | A1 | 9/2013 | Dahlfort et al. |
| 2013/0336653 | A1 | 12/2013 | Öhlén |
| 2014/0023372 | A1 | 1/2014 | Sambo et al. |

FOREIGN PATENT DOCUMENTS

| | | | |
|---|---|---|---|
| WO | WO 2007048650 | A1 | 5/2007 |
| WO | WO 2010/025767 | A1 | 3/2010 |
| WO | WO 2012/025148 | A1 | 3/2012 |

OTHER PUBLICATIONS

Acharya S. et al. "PESO: Low Overhead Protection for Ethernet over SONET Transport", INFOCOM 2004, the whole document.

Dahlfort S. et al. "Split Spectrum Approach to Elastic Optical Networking", ECOC 2012, the whole document.

Gringeri ST. et al., "Technical Considerations for Supporting Data Rates Beyond 100 Gb/s", IEEE Comm. Mag., Feb. 2012, the whole document.

ITU-T G.7042/Y.1305 (Mar. 2006), "Link capacity adjustment scheme (LCAS) for virtual concatenated signals", Mar. 2006, the whole document.

ITU-T G.707/Y.1322 (Jan. 2007), "Network node interface for the synchronous digital hierarchy (SDH)", Jan. 2007, the whole document.

Jinno M., et al., "Spectrum-Efficient and Scalable Elastic Optical Path Network: Architecture, Benefits, and Enabling Technologies", IEEE Comm. Mag.,47(11), Nov. 2009, the whole document.

Patel A.N. et al., "Routing, Wavelength Assignment, and Spectrum Allocation Algorithms in Transparent Flexible Optical WDM Networks", Optical Switching and Networking, Elsevier, NL, Feb. 7, 2012, the whole document.

Patel A.N. et al., "Routing, Wavelength Assignment, and Spectrum Allocation in Wavelength-Convertible Flexible Optical WDM (WC-FWDM) Networks", Optical Fiber Communication Conference and Exposition (OFC/NFOEC), 2012, and the National Fiber Optic Engineers Conference, IEEE, Mar. 4, 2012, the whole document.

Thiagarajan S. et al. "Spectrum efficient super-channels in dynamic flexible grid networks—a blocking analysis", OSA/OFC/NFOEC,2011, the whole document.

Li Y. et al., "Flexible Grid Label Format in Wavelength Switched Optical Network draft-li-ccamp-flexible-grid-label-00", Network Working Group, Internet Draft, Jul. 4, 2011, the whole document.

Shen et al: "From Coarse Grid to Mini-Grid to Gridless: How Much can Gridless Help Contentionless", OFC 2011, Mar. 6-10, 2011, paper OTu I3, pp. 1-3.

* cited by examiner

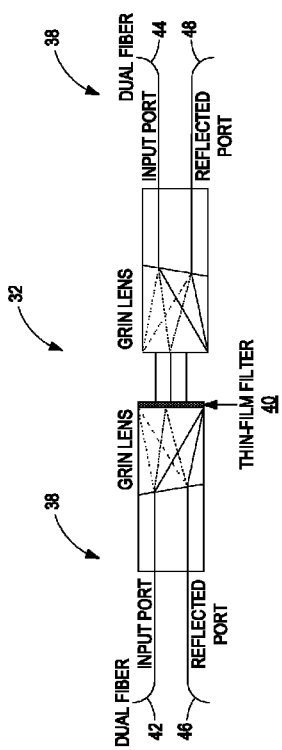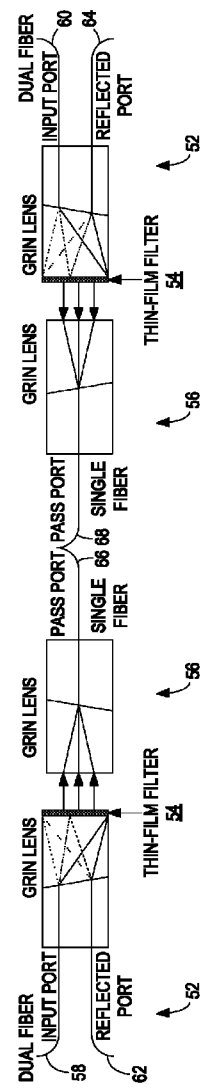
FIG. 3
FIG. 4

RESILIENCE IN AN ACCESS SUBNETWORK RING

TECHNICAL FIELD

The present invention generally relates to an access subnetwork ring, and particularly relates to a resilient add-drop module for use in one of multiple access subnetwork nodes forming such a ring, and to a method performed by that resilient add-drop module.

BACKGROUND

Increasing the flexibility with which an optical transport network can route wavelength channels has traditionally increased the efficiency of the network. Reconfigurable optical add/drop multiplexers (ROADMs) and mini-ROADMs have greatly contributed to this increased routing flexibility by enabling wavelength channels to be selectively added or dropped at any node in the network. However, ROADMs employ fairly complex and expensive components to provide this flexible routing capability along with resilience against fiber and node failures, meaning that ROAMDs prove cost-prohibitive in some contexts.

One such context relates to a network that efficiently transports the traffic of multiple services in a converged fashion. Rather than employing multiple different networks in parallel for transporting these different services (e.g., mobile, business, and residential services), a converged network transports those services together using the same network. A transport network that optically converges different services by transporting those services on different wavelength channels would be advantageous, for a variety of reasons, but has heretofore been precluded by the high cost of the necessary hardware components (e.g., ROADMs and mini-ROADMs).

Consequently, known transport networks converge different services using packet aggregation instead. While packet aggregation currently requires less hardware expense for converged transport, that expense will not scale equally with the significant traffic increases expected in the near future. Moreover, while packet aggregation suffices in many respects for realizing convergence, it proves inefficient in implementation. Indeed, converging multiple services at the packet level involves significant complexity in order to accommodate the different packet requirements associated with the different services.

SUMMARY

Embodiments herein advantageously reduce the complexity and accompanying cost of nodes in an optical network, as compared to known networks, while also providing resilience against fiber and node failures. With resilience and reduced complexity, the embodiments prove particularly useful for optically converging the traffic of multiple services.

More particularly, embodiments herein include a resilient add-drop module for use in any given one of multiple access subnetwork nodes forming an access subnetwork ring. The resilient add-drop module includes a dual-arm passive optical filter and a cyclic arrayed waveguide grating (AWG). The dual-arm passive optical filter is configured to resiliently drop any wavelength channels within a fixed band uniquely allocated to the access subnetwork node from either arm of the access subnetwork ring. The dual-arm filter is also configured to resiliently add any wavelength channels within the fixed band to both arms of the access subnetwork ring. With the dual-arm filter configured in this way, the cyclic AWG is configured to demultiplex wavelength channels dropped by the dual-arm filter and to multiplex wavelength channels to be added by the dual-arm filter.

The passive nature of the dual-arm filter with respect to the fixed band of wavelength channels advantageously reduces the cost and complexity of the access subnetwork node. And the cyclic nature of the AWG advantageously prevents the AWG from adding to the required number of module variants. Meanwhile, the dual-arm nature of the filter advantageously provides 1+1 resilience against the failure of fiber and nodes in the ring.

The dual-arm filter in some embodiments comprises a 4-port bandpass filter. In one embodiment, for example, the filter comprises a dual-fiber collimator on each side of a thin film filter. In another embodiment, the filter comprises two 3-port bandpass filters, where each 3-port filter comprises a dual-fiber collimator on one side of a thin film filter, and a single-fiber collimator on the other side of the thin film filter.

In some embodiments, the cyclic AWG has two multiplexed ports, with different multiplexed ports being associated with different arms of the access subnetwork ring. In this case, the dual-arm filter is configured to drop wavelength channels from different arms of the access subnetwork ring to different multiplexed ports of the cyclic AWG, and to add wavelength channels from different multiplexed ports of the cyclic AGW to different arms of the access subnetwork ring.

Furthermore, in at least some embodiments, the cyclic AWG has a plurality of demultiplexed ports, with the cyclic AWG mapping wavelength channels at a first one of the multiplexed ports to the demultiplexed ports differently than it maps wavelength channels at a second one of the multiplexed ports to the demultiplexed ports. In some of these embodiments, different pairs of demultiplexed ports correspond to different wavelength channels.

Accordingly, in some embodiment, the resilient add-drop module further includes one or more passive directional couplers that are connected to one or more respective pairs of demultiplexed ports, with the cyclic AWG mapping the same wavelength channel at different multiplexed ports to different demultiplexed ports in any given pair. In one embodiment, for example, each passive directional coupler has two ports connected to a respective pair of demultiplexed ports and two ports connected respectively to a transmitter and receiver of a client node.

Embodiments herein further include a method implemented by a resilient add-drop module in one of multiple access subnetwork nodes forming an access subnetwork ring. The method includes resiliently dropping, using a dual-arm passive optical filter, any wavelength channels within a fixed band uniquely allocated to the access subnetwork node from either arm of the access subnetwork ring. The method also includes demultiplexing dropped wavelength channels using a cyclic AWG, and multiplexing any wavelength channels within the fixed band to be added, using the cyclic AWG. Finally, the method entails resiliently adding, using the dual-arm passive optical filter, the multiplexed wavelength channels to both arms of the access subnetwork ring.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 3 is a block diagram of a dual-arm passive optical filter according to one or more embodiments.

FIG. 4 is a block diagram of a dual-arm passive optical filter according to one or more other embodiments.

DETAILED DESCRIPTION

Figure 1:
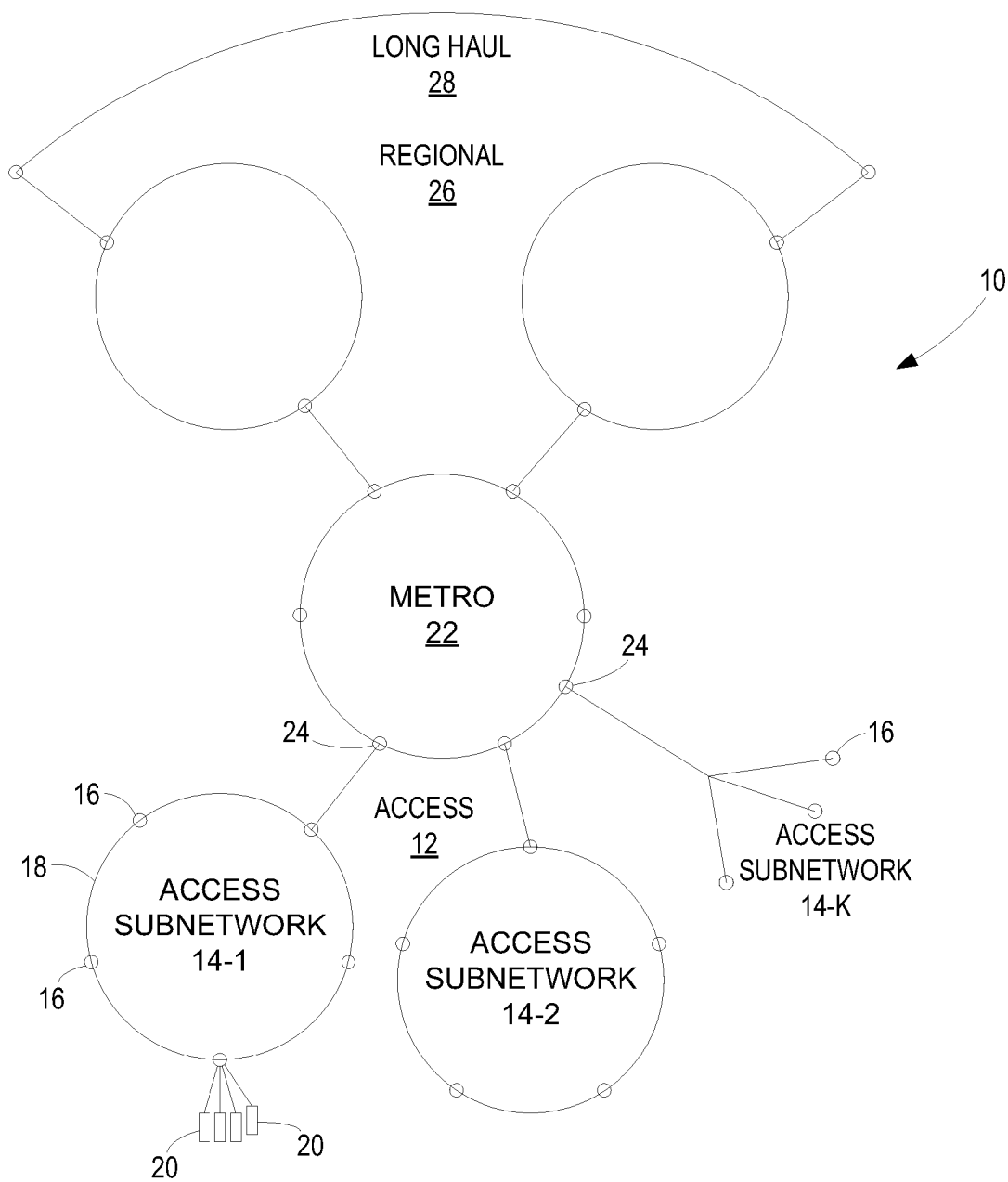
FIG. 1 is a block diagram of a generic tiered architecture for optical transport networks including an access subnetwork according to one or more embodiments.

FIG. 1 illustrates a generic tiered architecture 10 for optical transport networks configured to transport wavelength division multiplexed (WDM) traffic using different wavelength channels. The lowest tier shown, tier 1, is an access network 12 comprising a plurality of access subnetworks 14-1, 14-2, ... 14-K. Each access subnetwork 14-k is formed from multiple access subnetwork nodes 16 interconnected via optical fiber 18. When the nodes 16 of an access subnetwork 14 are interconnected in a ring structure, as shown for access subnetworks 14-1 and 14-2, the access subnetwork 14 is referred to as an access subnetwork ring. An access subnetwork ring in this regard provides resiliency against the failure of an access subnetwork node 16 and the failure of optical fiber 18. The nodes 16 of an access subnetwork 14 may of course be interconnected in other structures as well, including a tree structure (as shown for access subnetwork 14-K), a bus structure, a mesh structure, or any combination thereof.

In general, each access subnetwork node 16 connects to one or more client nodes 20, e.g., a remote radio unit, a base station, or other node that employs a conventional 2-fiber optical module (SFP, XFP, etc.). Connected to one or more client nodes 20, an access subnetwork node 16 aggregates the wavelength channels on which those client nodes 20 transmit uplink traffic and places (i.e., adds) the aggregated wavelength channels onto the access subnetwork 14 it forms. Similarly, the access subnetwork node 16 drops from the access subnetwork 14 the wavelength channels on which downlink traffic is transmitted to those client nodes 20.

The access network 12 in turn connects to a higher-tiered network; namely, a metro network 22 at tier 2. The metro network 20 is formed from a plurality of interconnected central offices (COs) 24 and transports WDM traffic for the access network 12. In this regard, each CO 24 adds wavelength channels from one or more access subnetworks 14 to the metro network 22 and drops wavelength channels from the metro network 22 to one or more access subnetworks 14. In an analogous manner, the metro network 22 connects to a higher-tiered network called the regional network 26, which in turn connects to a long haul network 28 for inter-regional transport.

Known implementation approaches to this tiered architecture 10 configure each access subnetwork node 16 with a fair amount of routing flexibility. Each access subnetwork node 16, for example, includes a mini reconfigurable optical add/drop multiplexer (mini-ROADM) that enables flexibility with regard to which wavelength channels are to be selectively added or dropped. However, because mini-ROADMs likely require integrated photonics in order to be cost-effective, known implementations prove cost-prohibitive and/or operationally limited in some contexts.

Embodiments herein advantageously reduce the complexity and accompanying cost of access subnetwork nodes 16, while also providing resilience against fiber and node failures. With resiliency and reduced complexity, the embodiments prove useful in a wider range of applications, such as optically converging the traffic of multiple services.

Figure 2:
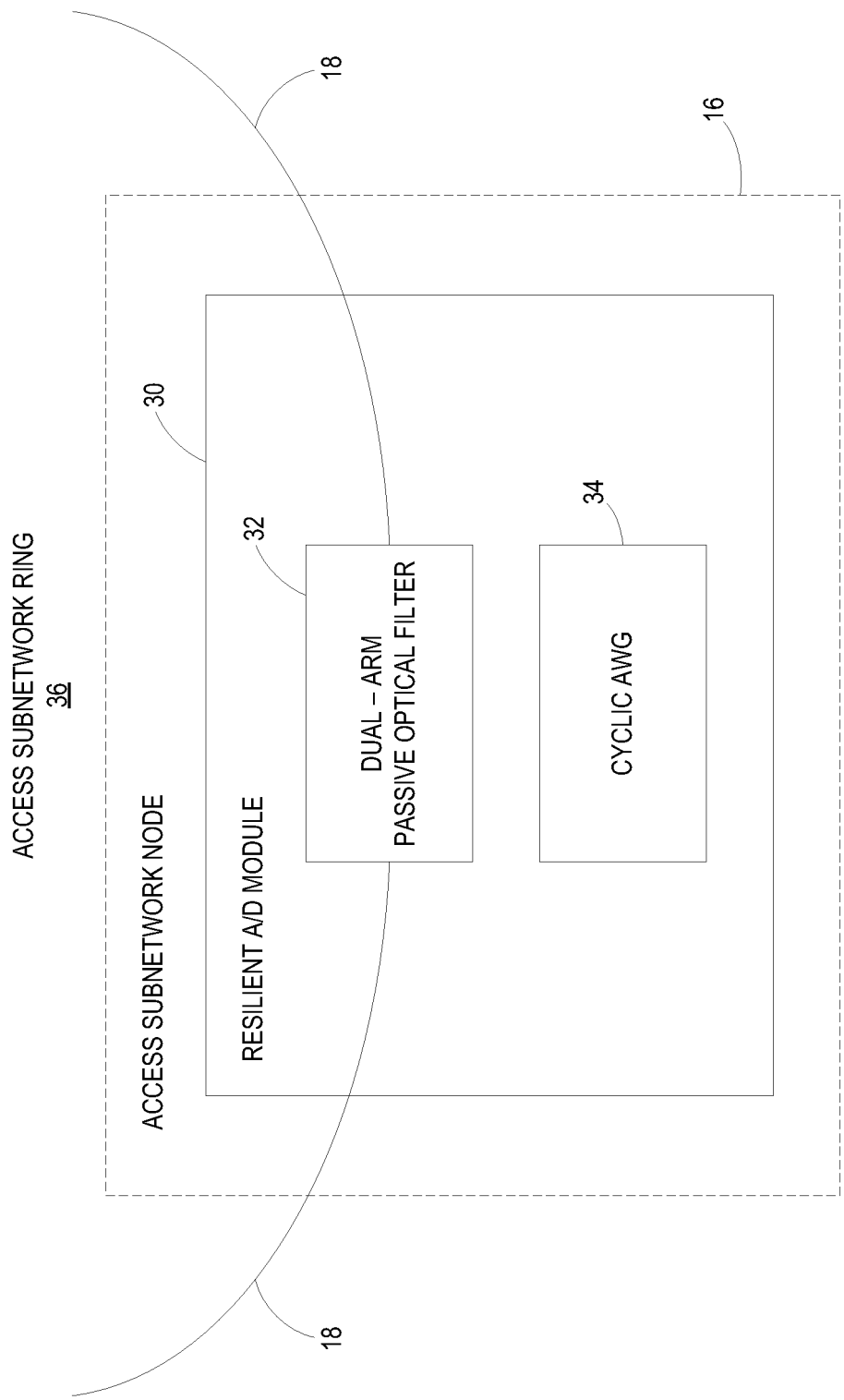
FIG. 2 is a block diagram of a resilient add-drop module for use in one of multiple access subnetwork nodes forming an access subnetwork ring, according to one or more embodiments.

More specifically, FIG. 2 depicts one embodiment of a resilient add-drop module for use in any given one of multiple access subnetwork nodes 16 forming an access subnetwork ring 36. The resilient add-drop module 30 includes a dual-arm passive optical filter 32 and a cyclic arrayed waveguide grating (AWG) 34. The dual-arm passive optical filter 32 is configured to resiliently drop any wavelength channels within a fixed band uniquely allocated to the access subnetwork node 16 from either arm of the access subnetwork ring 36. The dual-arm filter 32 is also configured to resiliently add any wavelength channels within the fixed band to both arms of the access subnetwork ring 36. With the dual-arm filter 32 configured in this way, the cyclic AWG 34 is configured to demultiplex wavelength channels dropped by the dual-arm filter 32 and to multiplex wavelength channels to be added by the dual-arm filter 32.

The passive nature of filter 32 with respect to the fixed band of wavelength channels advantageously reduces the cost and complexity of the access subnetwork node 16. Indeed, because the filter 32 simply passes a fixed band of wavelength channels, rather than actively selecting amongst multiple possible bands of wavelength channels to pass, the access subnetwork node 16 does not need to include power supply infrastructure for active passband selection.

The filter's passive nature nonetheless prevents the filter 32 from being used in multiple nodes 16 forming the same access subnetwork ring 36. This is because different nodes 16 forming the ring 36 are uniquely allocated different fixed bands of wavelength channels. With different nodes 16 being allocated different fixed bands, those different nodes 16 use different filters 32 to pass different fixed bands.

The uniqueness of filter 32 amongst the nodes 16 forming access subnetwork ring 36 means that the ring 36 employs at least as many variants of the resilient add-drop module 30 as there are nodes 16 forming the ring 36 (e.g., 8 or 10). That said, the cyclic nature of the AWG 34 advantageously prevents the AWG 34 from adding to this required number of module variants. In general, the AWG 34 is cyclic in the sense that it functions the same in different bands of wavelength channels. More technically, the free spectral range of an PxM AWG 34 corresponds to a width that covers M consecutive channels. Because the cyclic AWG 34 functions the same in different bands, different nodes 16 forming the ring 36 use a common cyclic AWG 34 despite using unique filters 32. Minimizing the number of module variants required in the ring 36 in this way, the cyclic AGW 34 in turn minimizes the operational cost associated with inventory management for the ring 36.

Meanwhile, the dual-arm nature of filter 32 advantageously provides 1+1 resilience against the failure of fiber 18 and nodes 16 in the ring 36. Indeed, because the dual-arm filter 32 is configured to drop wavelength channels from either arm of the ring 36, the filter 32 may receive those channels over a different arm in the event of a fiber 18 or node 16 failure on the other arm. Similarly, because the dual-arm filter 32 is configured to add wavelength channels to both arms of the ring 36, the filter 32 proactively guards against a fiber 18 or node 16 failure on one arm preventing the transport of those channels.

In some embodiments, this dual-arm passive optical filter 32 comprises multiple cascaded add-drop filters, each filtering out a specific wavelength channel. In other embodiments, though, the dual-arm filter 32 comprises a bandpass filter. In some contexts, such a bandpass filter proves advantageous over multiple cascaded add-drop filters because the bandpass filter minimizes insertion loss and thereby reduces the total loss of wavelengths traversing the ring 36. Regardless, the bandpass filter in at least one embodiment comprises a 4-port bandpass filter. The 4-port filter has 2 ports connected to different arms of the ring 36 and two ports connected to the cyclic AWG 34 (via zero or more passive directional couplers as explained in more detail below).

FIG. 3 illustrates this 4-port bandpass filter according to one or more embodiments. As shown in FIG. 3, the filter 32 comprises a dual-fiber collimator 38 on each side of a thin film filter 40. The different input ports 42, 44 of the different collimators 38 are connected to different arms of the ring 36, while the different reflected ports 46, 68 of the different collimators 38 are connected to the cyclic AWG 34.

FIG. 4 illustrates the 4-port bandpass filter according to one or more alternative embodiments. As shown in FIG. 4, the filter 32 comprises two 3-port bandpass filters 50. Each 3-port filter 50 comprises a dual-fiber collimator 52 (which in one example uses a GRIN lens) on one side of a thin film filter 54, and a single-fiber collimator 56 on the other side of the thin film filter 54. The different input ports 58, 60 of the different dual-fiber collimators 52 are connected to different arms of the ring 36, while the different reflected ports 62, 64 of the different dual-fiber collimators 52 are connected to the cyclic AWG 34. The single-fiber collimators 56 are connected together at the different pass ports 66, 68 of the 3-port filters 50.

Regardless of the particular implementation of the filter 32, the cyclic AWG 34 in at least some embodiments has one or more multiplexed ports and a plurality of demultiplexed ports. The cyclic AWG 34 receives wavelength channels dropped by the filter 32 at the one or more multiplexed ports, demultiplexes those channels, and then outputs them at the plurality of demultiplexed ports. Conversely, the cyclic AWG 34 receives different wavelength channels from different client nodes 20 at the different demultiplexed ports, multiplexes the those channels together, and then outputs them at the one or more multiplexed ports.

Figure 5:
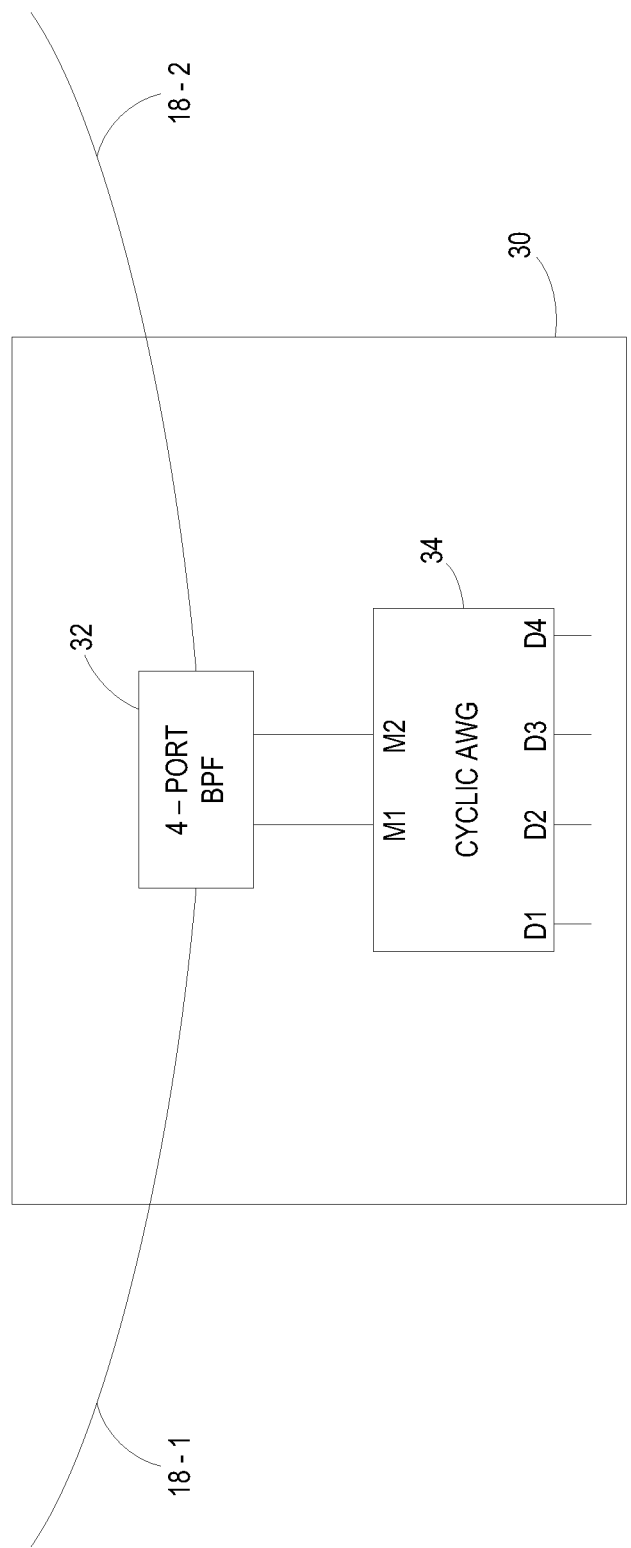
FIG. 5 is a block diagram of a resilient add-drop module according to one or more embodiments where the dual-arm passive optical filter is a 4-port bandpass filter and the cyclic AWG has two multiplexed ports.

FIG. 5 illustrates an example of one or more embodiments where the filter 32 comprises a 4-port bandpass filter (BPF) and the cyclic AWG 34 has two multiplexed ports, M1 and M2. In this case, the filter 32 is connected to the cyclic AWG 34 directly, i.e., not via any directional couplers. Connected in this way, the filter 32 drops wavelength channels from different arms 18-1, 18-2 of the ring 36 to different multiplexed ports M1, M2 of the cyclic AWG 34. Similarly, the filter 32 adds wavelength channels from different multiplexed ports M1, M2 to different arms 18-1, 18-2 of the ring 36. The different multiplexed ports M1, M2 therefore correspond to or are otherwise associated with different arms 18-1, 18-2 of the access subnetwork ring 36.

Figure 6:
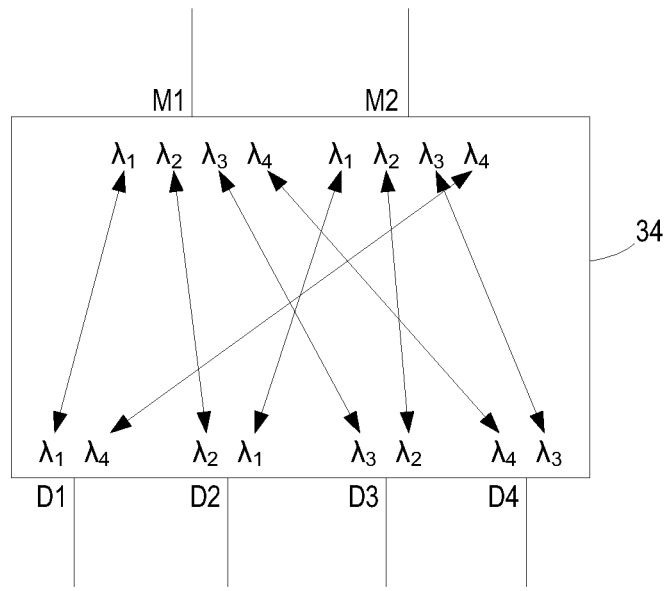
FIG. 6 illustrates a simple example mapping between multiplexed ports and demultiplexed ports of a cyclic AWG according to one or more embodiments.

With the multiplexed ports M1, M2 associated with ring arms in this way, the cyclic AWG 34 multiplexes and demultiplexes the wavelength channels according to a predefined mapping between the two multiplexed ports M1, M2 and the plurality of demultiplexed ports (shown in FIG. 5 as four demultiplexed ports D1-D4). This predefined mapping more particularly specifies to which demultiplexed port D1-D4 a given wavelength channel at a given multiplexed port M1, M2 is to be demultiplexed, and vice versa. In at least some embodiments, the cyclic AWG 34 maps wavelength channels at M1 to the demultiplexed ports D1-D4 differently than it maps wavelength channels at M2 to the demultiplexed ports D1-D4. FIG. 6 illustrates a simple example of these embodiments.

As shown in FIG. 6, the cyclic AWG 34 demultiplexes and multiplexes four wavelength channels $\lambda 1$-$\lambda 4$. In doing so, the cyclic AWG 34 maps wavelength channels $\lambda 1$, $\lambda 2$, $\lambda 3$, and $\lambda 4$ at M1 to respective demultiplexed ports D1, D2, D3, and D4. The cyclic AWG 34 however maps wavelength channels at M2 to the demultiplexed ports D1-D4 differently. As shown, for instance, the cyclic AWG 34 maps wavelength channels $\lambda 1$, $\lambda 2$, $\lambda 3$, and $\lambda 4$ at M2 to respective demultiplexed ports D2, D3, D4, and D1. Accordingly, wavelength channels at D1 include $\lambda 1$ (associated with M1) and $\lambda 4$ (associated with M2), wavelength channels at D2 include $\lambda 2$ (associated with M1) and $\lambda 2$ (associated with M2), wavelength channels at D3 include $\lambda 3$ (associated with M1) and $\lambda 2$ (associated with M2), and wavelength channels at D4 include $\lambda 4$ (associated with M1) and $\lambda 3$ (associated with M2).

Consequently, when the cyclic AWG 34 receives $\lambda 1$ at a pair $P_{\lambda,1}$ of demultiplexed ports including both D1 and D2, it outputs $\lambda 1$ at both M1 and M2; conversely, when the cyclic AWG 34 receives $\lambda 1$ at either M1 or M2, it outputs $\lambda 1$ at either D1 or D2, respectively. When the cyclic AWG 34 receives $\lambda 2$ at a pair $P_{\lambda,2}$ of demultiplexed ports including both D2 and D3, it outputs $\lambda 2$ at both M1 and M2; conversely, when the cyclic AWG 34 receives $\lambda 2$ at either M1 or M2, it outputs $\lambda 2$ at either D2 or D3, respectively. When the cyclic AWG 34 receives $\lambda 3$ at a pair $P_{\lambda,3}$ of demultiplexed ports including both D3 and D4, it outputs $\lambda 3$ at both M1 and M2; conversely, when the cyclic AWG 34 receives $\lambda 3$ at either M1 or M2, it outputs $\lambda 3$ at either D3 or D4, respectively. And when the cyclic AWG 34 receives $\lambda 4$ at a pair $P_{\lambda,4}$ of demultiplexed ports including both D1 and D4, it outputs λ4 at both M1 and M2; conversely, when the cyclic AWG 34 receives λ4 at either M1 or M2, it outputs λ4 at either D1 or D4, respectively. In other words, the cyclic AWG 30 maps the same wavelength channel (e.g., λ4) at different multiplexed ports M1, M2 to different demultiplexed ports (e.g., D1 and D4) in any given pair (e.g., $P_{\lambda 4}$).

In at least some embodiments, the resilient add-drop node 30 includes one or more passive directional couplers that are connected to one or more respective pairs $P_{\lambda 1}$-$P_{\lambda 4}$ of demultiplexed ports. With each pair $P_{\lambda 1}$-$P_{\lambda 4}$ associated with a respective wavelength channel λ1-λ4, each passive directional coupler likewise becomes associated with a respective wavelength channel λ1-λ4 for use by client nodes 20.

Figure 7:
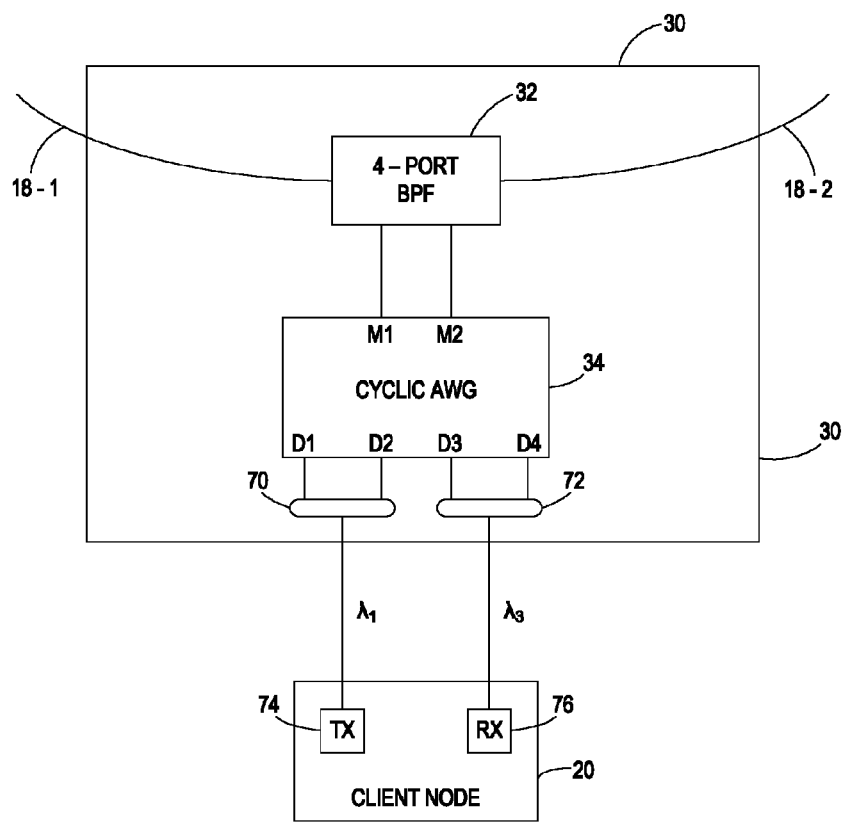
FIG. 7 is a block diagram of a resilient add-drop module that includes one or more passive directional couplers according to one or more embodiments.

FIG. 7 illustrates a simple example of these embodiments where the resilient add-drop node 30 includes one or more passive directional couplers. As shown in FIG. 7, each coupler (i.e., splitter/combiner) has two ports connected to a respective pair of demultiplexed ports and one port connected to a client node 20. In this example, the resilient add-drop node 30 includes one coupler 70 with two ports connected to the pair $P_{\lambda 1}$ of demultiplexed ports including D1 and D2, and one port connected to the transmitter (TX) 74 of a client node 20. Accordingly, when the client node's transmitter 74 transmits traffic to the access subnetwork ring 36 on wavelength channel λ1, the coupler 70 couples that wavelength channel λ1 to both demultiplexed ports D1 and D2 in the pair $P_{\lambda 1}$, the cyclic AWG 34 outputs the channel λ1 at both multiplexed ports M1 and M2, and the 4-port BPF 32 resiliently adds the channel λ1 to both arms 18-1 and 18-2 of the ring 36.

Similarly, the resilient add-drop node 30 in the example of FIG. 7 includes another coupler 72 with two ports connected to the pair $P_{\lambda 3}$ of demultiplexed ports including D3 and D4, and one port connected to the receiver (RX) 76 of the client node 20. Accordingly, when the 4-port BPF 32 receives wavelength channel λ3 over arm 18-1 of the ring 36, the BPF 32 resiliently drops that channel to multiplexed port M1 of the cyclic AWG 34. The cyclic AWG 34 in turn demultiplexes the channel λ3 to demultiplexed port D3, whereupon the coupler 72 couples the channel λ3 to the client node's receiver 76. Conversely, when the 4-port BPF 32 receives wavelength channel λ3 over arm 18-2 of the ring 36 (e.g., if there is a fiber or node failure along arm 18-1), the BPF 32 resiliently drops that channel λ3 to multiplexed port M2 of the cyclic AWG 34. The cyclic AWG 34 in turn demultiplexes the channel λ3 to demultiplexed port D4, whereupon the coupler 72 couples the channel λ3 to the client node's receiver 76.

Figure 8:
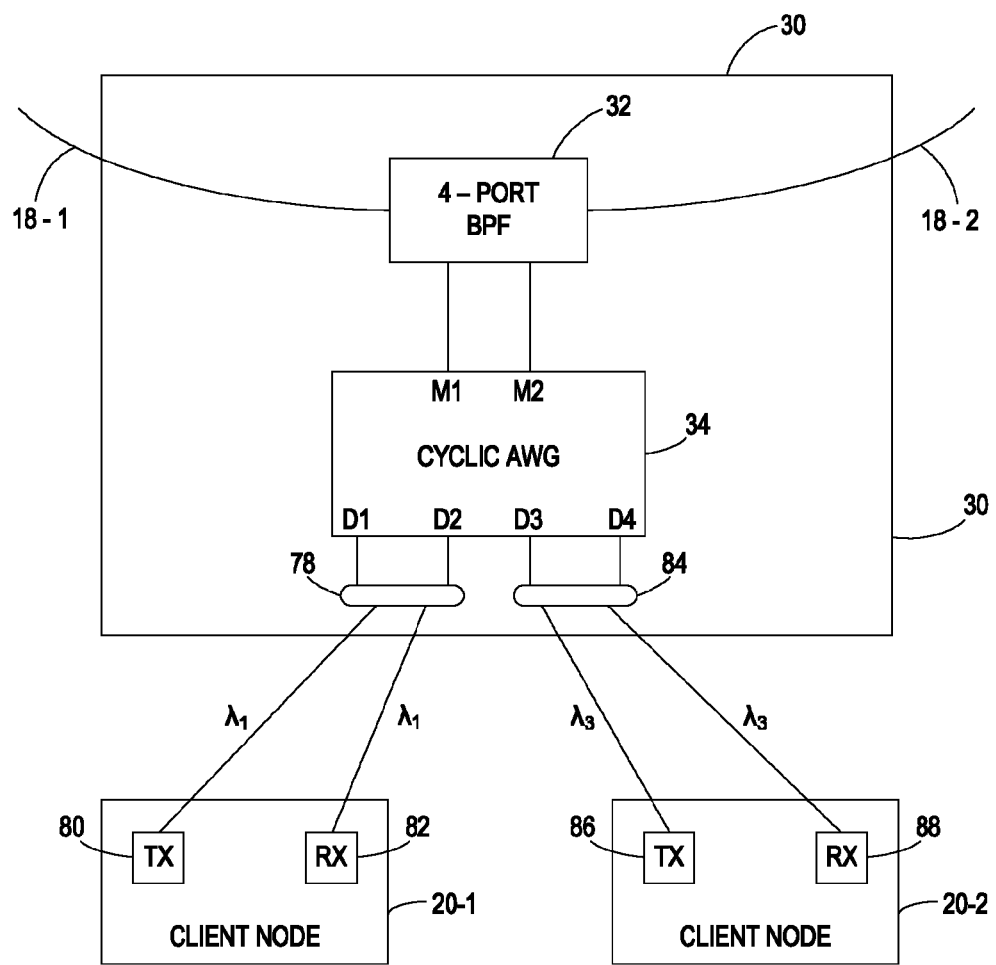
FIG. 8 is a block diagram of a resilient add-drop module that includes one or more passive directional couplers, and that employs wavelength reuse, according to one or more embodiments.

In the example of FIG. 7, the client node's transmitter 74 and receiver 76 use different wavelength channels. In at least some embodiments, though, a client node's transmitter and receiver use the same wavelength channel, e.g., according to inverse return to zero/return to zero (IRZ/RZ) wavelength re-use. Reusing wavelength channels in this way advantageously conserves channel resources and increases the number of client nodes 20 that can be connected to any given access subnetwork node 16. FIG. 8 illustrates a simply example in this regard, which advantageously employs wavelength reuse using one or more couplers in the resilient add-drop module 30 (rather than in a client node 20) without increasing wavelength loss.

As shown in FIG. 8, the resilient add-drop node 30 includes one or more passive directional couplers just as in FIG. 7, but a coupler in FIG. 8 has two ports connected to a client node 20 rather than just one port. More specifically, the resilient add-drop node 30 includes one coupler 78 with two ports connected to the pair $P_m$ of demultiplexed ports including D1 and D2, and two ports connected respectively to the transmitter 80 and receiver 82 of a first client node 20-1. Accordingly, when the client node's transmitter 80 transmits traffic to the access subnetwork ring 36 on wavelength channel λ1, the coupler 78 couples that wavelength channel λ1 to both demultiplexed ports D1 and D2 in the pair $P_{\lambda 1}$, the cyclic AWG 34 outputs the channel λ1 at both multiplexed ports M1 and M2, and the 4-port BPF 32 resiliently adds the channel λ1 to both arms 18-1 and 18-2 of the ring 36.

Conversely, when the 4-port BPF 32 receives wavelength channel λ1 over arm 18-1 of the ring 36, the BPF 32 resiliently drops that channel to multiplexed port M1 of the cyclic AWG 34. The cyclic AWG 34 in turn demultiplexes the channel λ1 to demultiplexed port D1, whereupon the coupler 78 couples the channel λ1 to the client node's receiver 82. Conversely, when the 4-port BPF 32 receives wavelength channel λ1 over arm 18-2 of the ring 36 (e.g., if there is a fiber or node failure along arm 18-1), the BPF 32 resiliently drops that channel λ1 to multiplexed port M2 of the cyclic AWG 34. The cyclic AWG 34 in turn demultiplexes the channel λ1 to demultiplexed port D2, whereupon the coupler 78 couples the channel λ1 to the client node's receiver 82.

Similarly, the resilient add-drop node 30 includes another coupler 84 with two ports connected to the pair $P_{\lambda 3}$ of demultiplexed ports including D3 and D4, and two ports connected respectively to the transmitter 86 and receiver 88 of a second client node 20-2. This coupler 84 functions in an analogous manner with respect to wavelength channel λ3, which is reused by the transmitter 86 and receiver 88 of the second client node 20-2.

Figure 9:
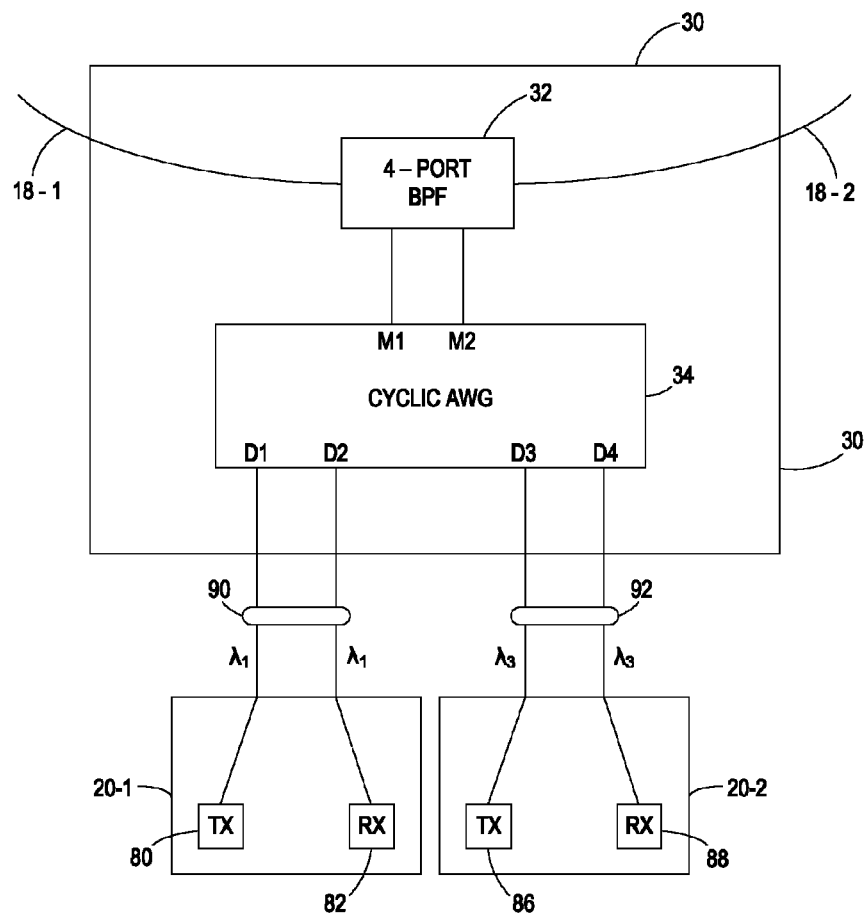
FIG. 9 is a block diagram of a resilient add-drop module that excludes one or more passive directional couplers according to one or more embodiments.

As illustrated in FIGS. 7 and 8 above, the resilient add-drop module 30 includes one or more passive directional couplers that effectively dictate particular wavelength channels that the module 30 supports. In some embodiments, any given module 30 is configured to support only a subset of the wavelength channels (e.g., odd channels) within the fixed band allocated to that module 30. This reduces the cost associated with any given module 30 (i.e., by limiting the number of couplers within the module). This however also introduces additional module variants in order to support the other wavelength channels (e.g., even channels) within the fixed band. Other embodiments herein therefore exclude the one or more passive directional couplers from a module 30 itself in order to provide increased flexibility. FIG. 9 illustrates a simple example of this.

The resilient add-drop module 30 in FIG. 8 is the same as the module 30 in FIG. 8, except that the built-in passive directional couplers 78 and 84 are excluded from the module 30 itself as couplers 90 and 92. Excluding the couplers 90 and 92 from the module 30 does not affect functionality, but increases flexibility while also limiting the number of module variants. The excluded couplers 90 and 92 are connected in this manner using any known mechanism, e.g., patch cords.

Figure 10:
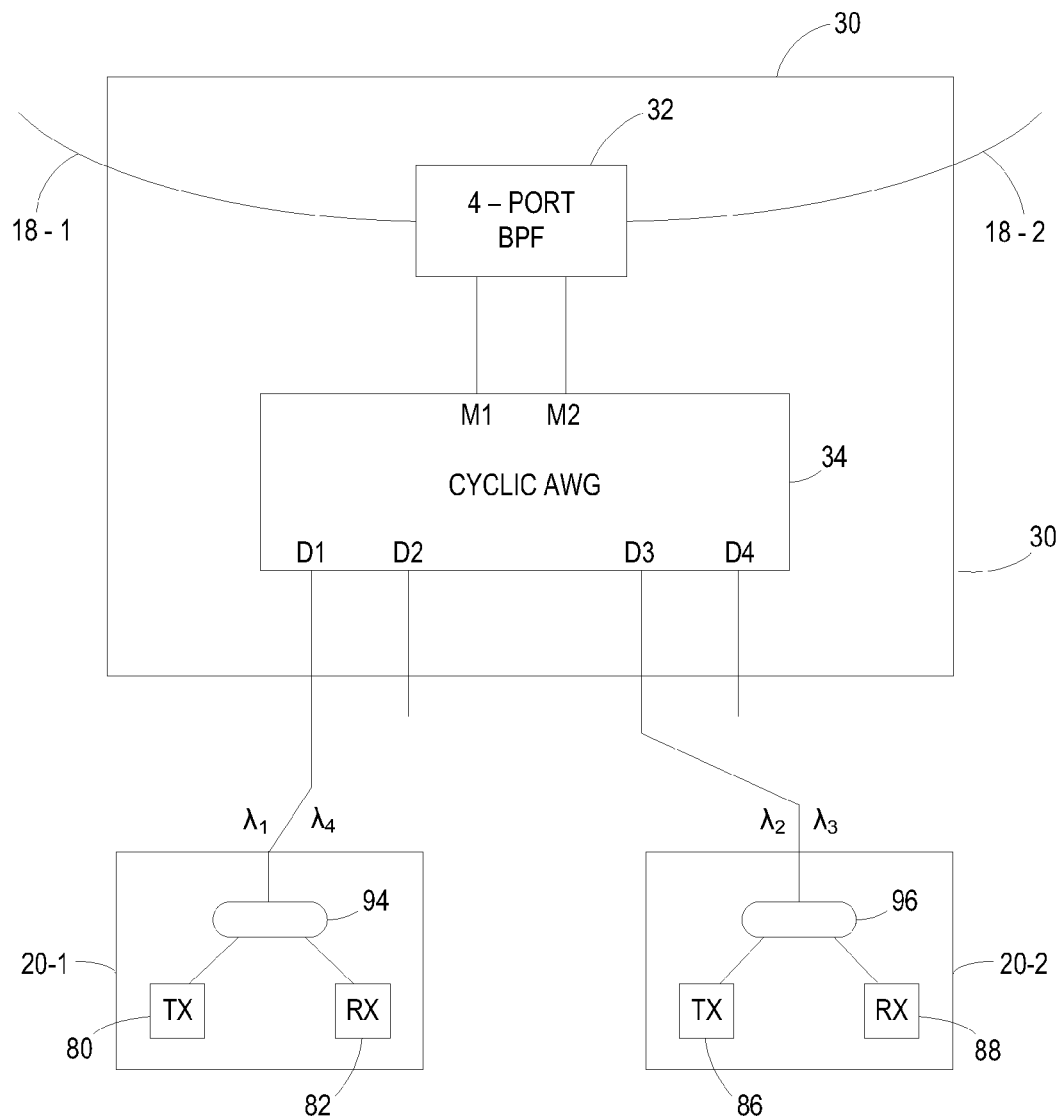
FIG. 10 is a block diagram of a resilient add-drop module configured for resilience in conjunction with wavelength tunable transmitters and/or receivers of a client node.

Those skilled in the art will of course appreciate that, while FIG. 7-9 implement resilience with the assistance of one or more passive directional couplers connected to one or more respective pairs of demultiplexed ports, the present invention is not limited in this respect. As shown in the embodiment of FIG. 10, for instance, demultiplexed ports of the cyclic AWG 34 connect directly to respective client nodes 20, i.e., not indirectly via one or more passive directional couplers. Of course, where the client node's employ wavelength re-use (as shown), the client nodes 20 themselves include passive directional couplers 94, 96 (or a circulator, or the like) to couple the demultiplexed ports to their transmitters and receivers. Regardless, the client nodes 20 include wavelength tunable transmitters and/or receivers in order to realize resilience using the multiple wavelength channels at any given demultiplexed port.

In the example of FIG. 10, for instance, demultiplexed port D1 connects to client node 20-1. The client node 20-1 includes a wavelength tunable transmitter 80 and a wavelength tunable receiver 82, which re-use both wavelengths λ1 and λ4 for transmission and reception (i.e., the transmitter 80 reuses both λ1 and λ4 for transmission, and the receiver 82 reuses both λ1 and λ4 for reception). When the client node's transmitter 80 transmits traffic to the access subnetwork ring 36, the transmitter 80 tunes to wavelength channel λ1 and transmits that traffic. The coupler 94 couples that wavelength channel λ1 to demultiplexed port D1, the cyclic AWG 34 outputs the channel λ1 at multiplexed port M1, and the 4-port BPF 32 adds the channel λ1 to arm 18-1 of the ring 36. Previously or subsequently to transmitting on channel λ1, the transmitter 80 tunes to wavelength channel λ4 and transmits the traffic. The coupler 94 couples that wavelength channel λ4 to demultiplexed port D1, the cyclic AWG 34 outputs the channel λ4 at multiplexed port M2, and the 4-port BPF 32 resiliently adds the channel λ4 to arm 18-2 of the ring 36. In this way, the resilient add-drop module 30 provides resilience even though the uplink traffic is transmitted on different wavelength channels λ1 and λ4.

The resilient add-drop node 30 functions in an analogous manner for resilience with respect to downlink traffic, and in an analogous manner for client node 20-2.

Figure 11:
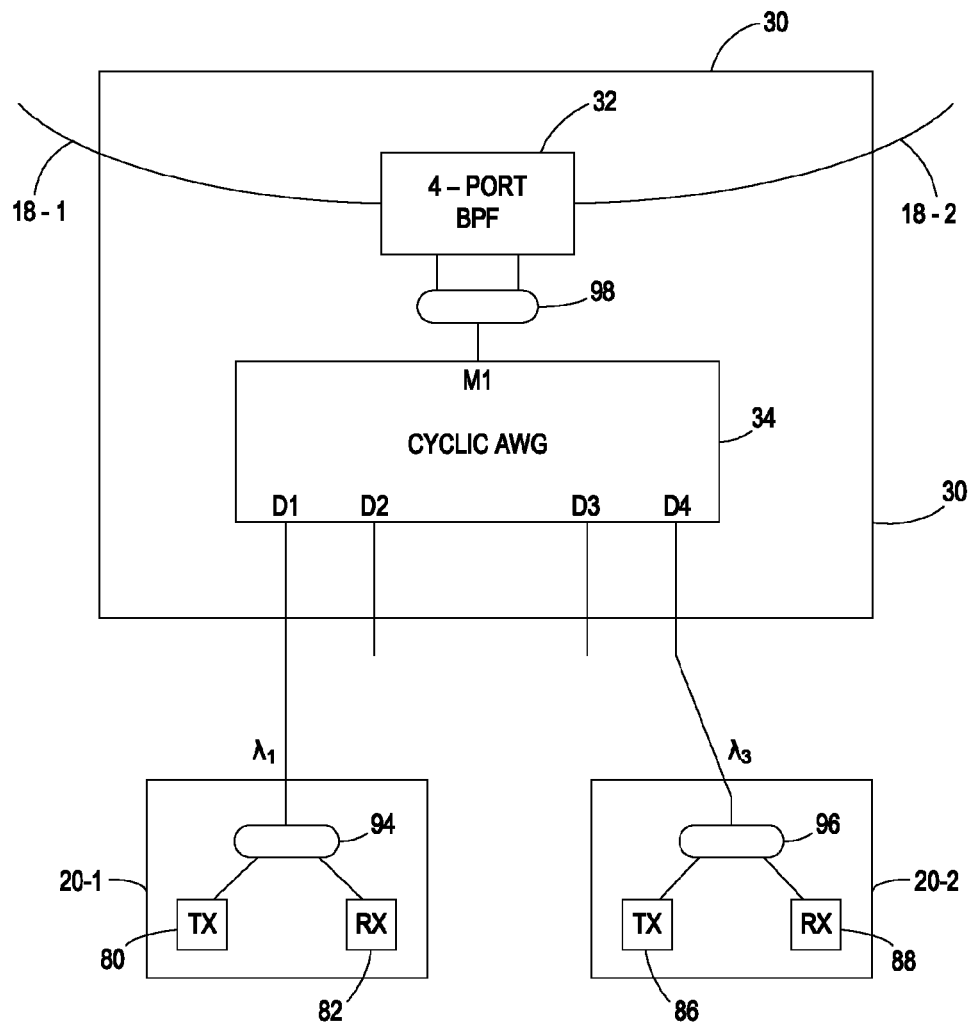
FIG. 11 is a block diagram of a resilient add-drop module that includes a cyclic AWG with one multiplexed port and a passive directional coupler connecting that multiplexed port to a 4-port bandpass filter, according to one or more embodiments.

Those skilled in the art will also appreciate that, while FIG. 5-10 show the cyclic AWG 34 as having two multiplexed ports M1 and M2, the present invention is not limited in this respect either. FIG. 11, for example, shows an embodiment where the cyclic AWG 34 has only a single multiplexed port M1. In this case, the resilient add-drop node 30 further includes a passive directional coupler 98 that couples the filter 32 to the multiplexed port M1 of the cyclic AWG 34. The coupler 98 thus effectively couples the single multiplexed port M1 to both arms 18-1 and 18-2 of the ring 36 and relaxes the requirements of a client node's transmitter and receiver (as compared to FIG. 10) for providing resilience (i.e., the transmitter and receiver do not need to be wavelength tunable). For example, when the transmitter 80 of client node 20-1 transmits traffic to the access subnetwork ring 36 on wavelength channel λ1, the coupler 94 couples that wavelength channel λ1 to demultiplexed port D1, the cyclic AWG 34 outputs the channel λ1 at multiplexed port M1, the coupler 98 couples the channel λ1 to two ports of the 4-port BF 32, and the 4-port BPF 32 resiliently adds the channel λ1 to both arms 18-1 and 18-2 of the ring 36. The resilient add-drop node 30 functions in an analogous manner for resilience with respect to downlink traffic.

Figure 12:
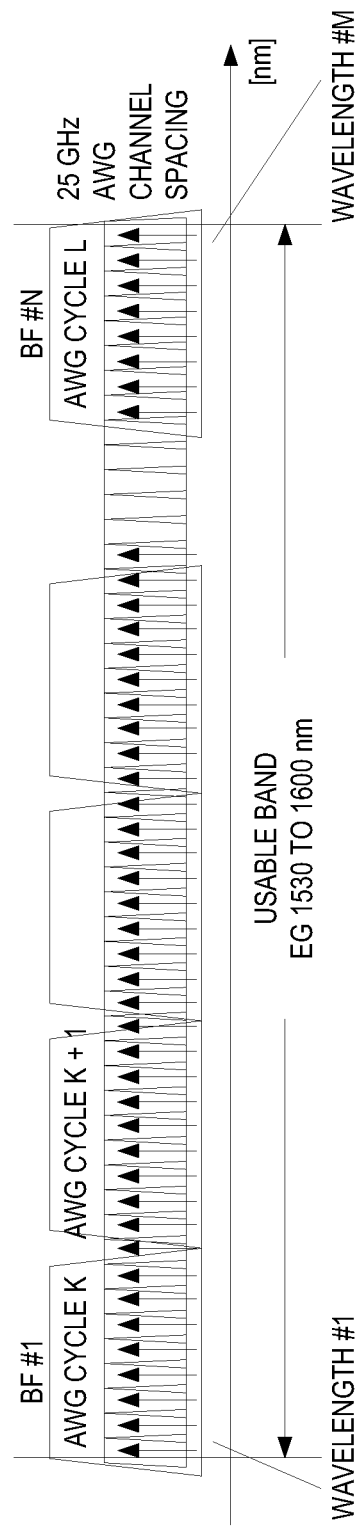
FIG. 12 illustrates an example of a wavelength plan for an access network, according to one or more embodiments.

Regardless of the variations and modifications discussed above, FIG. 12 illustrates one example of a wavelength plan for an access network 12 herein. As shown in FIG. 12, the wavelength plan envisions N different fixed bands of wavelength channels within an access network 12. With N different fixed bands possible, the access network 12 employs at least N different variants of resilient add-drop modules 30, since at least N different dual-arm passive optical filters 32 for passing those N different fixed bands. These N different filters 32 are labeled in FIG. 12 from BF #1 to BF # N. Also shown in FIG. 12, the wavelength plan envisions M different wavelength channels (labeled as wavelength #1 to wavelength #M) and L−K+1 different AWG cycles (labeled as cycle K to cycle L). In at least some embodiments, such as the one shown, the AWG 34 has contiguous cycles, since this allows access to all wavelengths within the usable band by using a single (i.e., common) AWG 34 throughout the access network 12. FIG. 12 illustrates an example where the AWG cycle spacing is the same as the wavelength channel spacing (e.g., 25 GHz), meaning that the AWG 34 has 8 demultiplexed ports as shown.

Although the passband of the filters 32 are shown in FIG. 12 as being aligned to the AWG cycles, the present invention is not limited in this respect. In at least some embodiments, for example, central offices (COs) 24 in the metro network 22 are advantageously configured to route or otherwise steer particular wavelength channels to particular access subnetwork nodes 16. For example, the central offices 24 in one embodiment each employ a single wavelength selective switch (WSS) according to U.S. patent application Ser. No. 13/420,416, the entire contents of which is incorporated herein by reference. Regardless of the particular CO implementation, though, if the passband of filters 32 is not aligned to the AWG cycles, the COs 24 are configured to selectively steer to the access subnetwork nodes 16 only those wavelength channels within the filters' passbands. For example, if the passband width is smaller than an AWG cycle, all AWG ports cannot be used. Conversely, if the passband width is wider than an AWG cycle, the CO 24 is configured to ensure that wavelength channels belonging to the same physical AWG port (from different AWG cycles) are not set to the ring 34.

Figure 13:
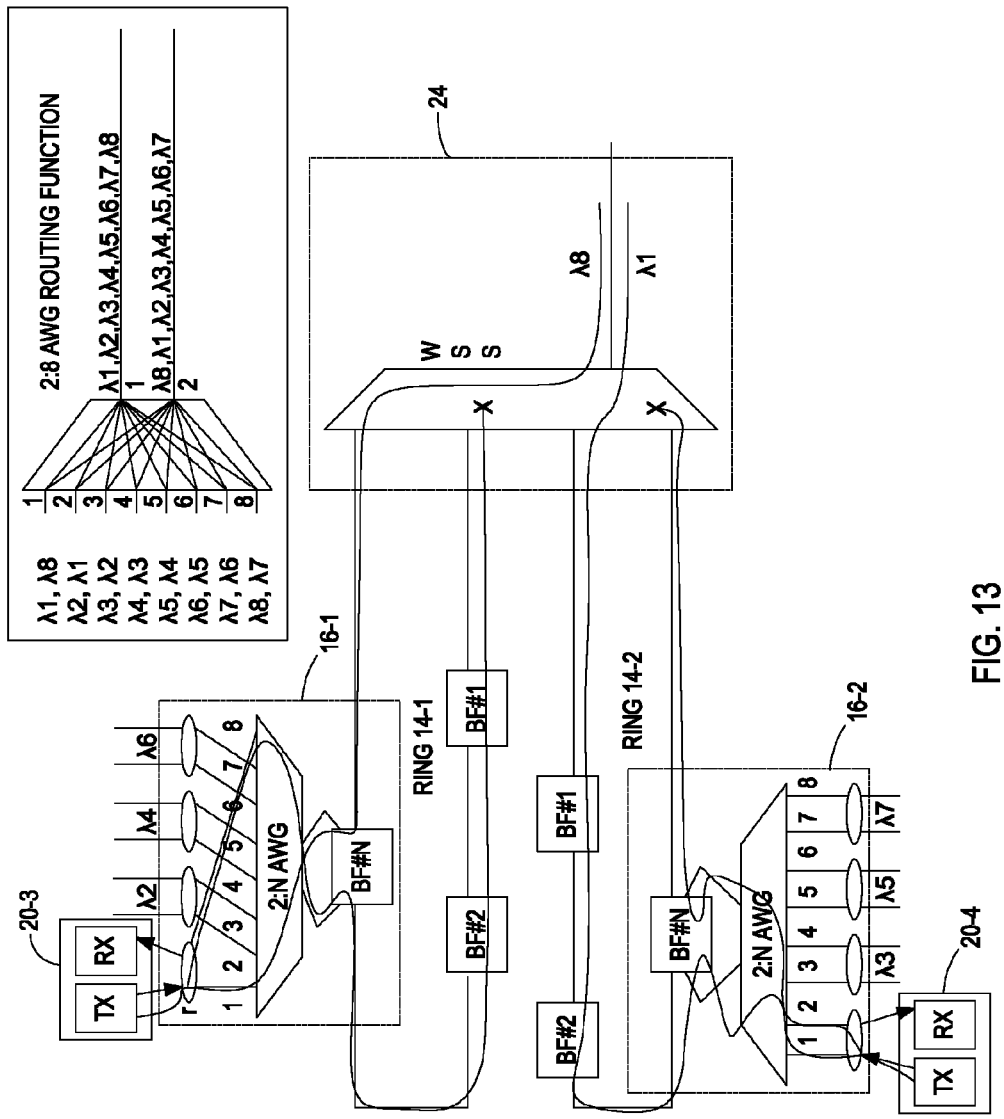
FIG. 13 illustrates an example of an access network and a central office of a metro network configured to steer particular wavelength channels to particular access subnetwork nodes, according to one or more embodiments.

FIG. 13 illustrates a simple example of an embodiment that employs a CO 24 with a WSS configured to steer particular wavelength channels to particular access subnetwork nodes 16. As shown in this example, the access network 12 includes two access subnetwork rings 14-1 and 14-2 connected to the WSS of the CO 24. Each access subnetwork ring 14-1, 14-2 is formed from access subnetwork nodes 16 that use different variants of resilient add-drop module 30. The module variants used by the nodes 16 forming any given ring 14 comprise unique dual-arm passive optical filters (i.e., BF #1 . . . BF#N), but the module variants used by pairs of nodes 16 forming different rings 14 may comprise the same dual-arm passive optical filter, as seen for the pair of nodes 16-1 and 16-2 shown in FIG. 13. Moreover, a pair of such nodes 16-1 and 16-2 even include passive directional couplers that are connected to the same pairs of AWG demultiplexed ports. However, the CO 24 is configured to provide the associated client nodes 20-3 and 20-4 with different wavelength channels λ8 and λ1, respectively, on which to transmit and receive.

As shown, for example, client node 20-3 transmits on λ8, which is resiliently added by node 16-1 to both arms of ring 14-1. The CO 24 selectively chooses to receive the wavelength channel λ8 from one arm. Conversely, client node 20-4 transmits on λ1, which is resiliently added by node 16-2 to both arms of ring 14-2. The CO 24 likewise selectively chooses to receive the wavelength channel λ1 from one arm.

Figure 14:
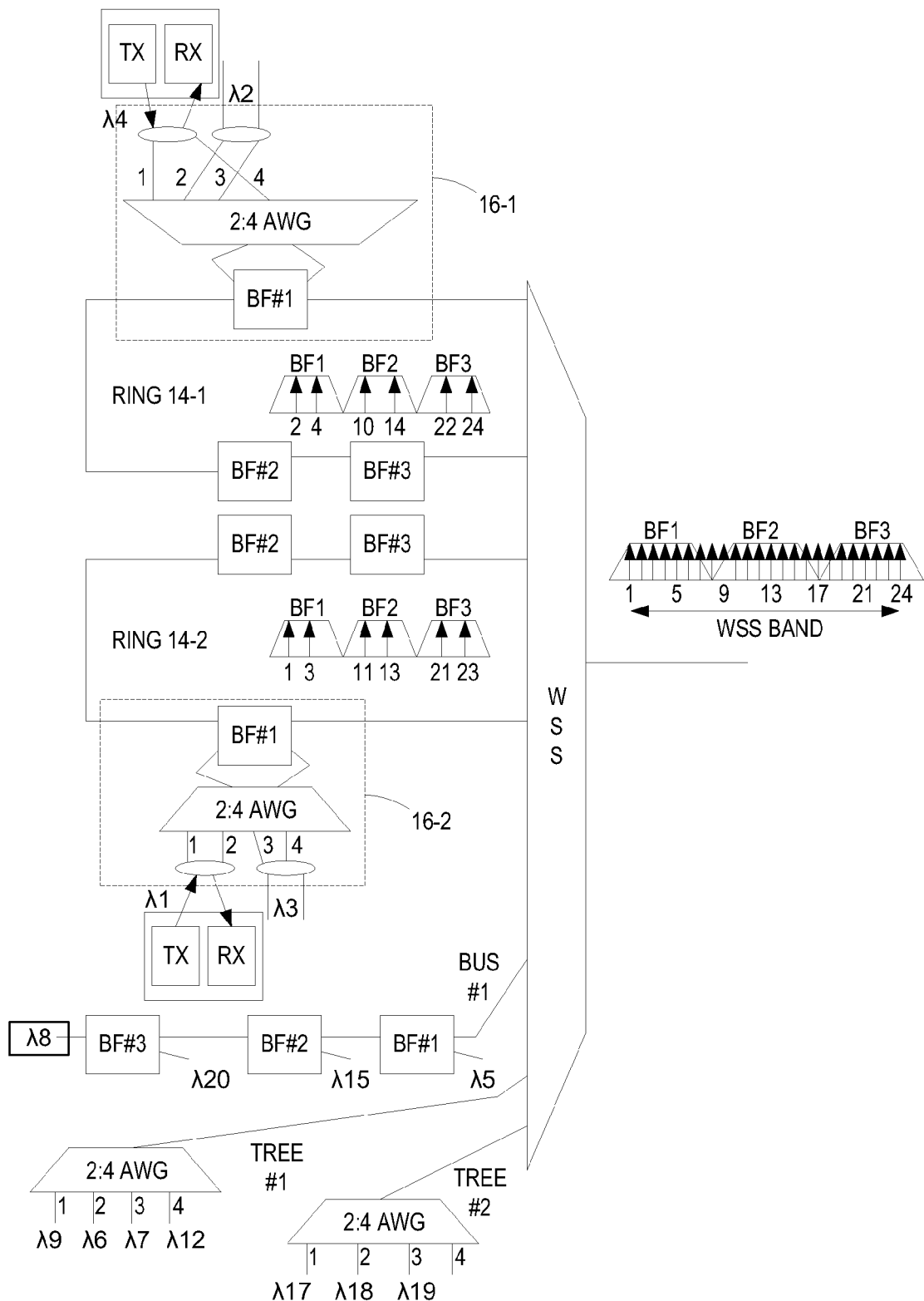
FIG. 14 illustrates an example of an access network that includes one or more busses and rings that use wavelength channels which cannot be used in access subnetwork rings of the access network.

Because in practice filters 32 are imperfect in passing fixed bands of wavelength channels, the filters 32 may leave holes in the usable band. Thus, the access subnetwork rings 14-1 and 14-2 themselves may not be able to use all of the wavelength channels in the usable band. However, according to one or more embodiments herein, other access subnetworks 14 (e.g., trees and/or busses) are configured to use such channels. FIG. 14 illustrates a simple example of this.

The access network 12 in FIG. 14 employs a band of 24 wavelengths channels. The WSS in the CO 24 that interconnects the access subnetworks 14 shown steers these wavelength channels to particular access subnetworks 14. Specifically, the WSS steers channels 2, 4, 10, 14, 22, and 24 to ring 14-1, and steers channels 1, 3, 11, 13, 21, and 23 to ring 14-2. Access subnetwork nodes 16-1 and 16-2 in different rings 14-1 and 14-2 both include the same variant of filter 32, and both have the same 2:4 cyclic AWG, but have passive directional couplers connected to different pairs of demultiplexed ports corresponding to channels 1 and 3 and channels 2 and 4 respectively. Accordingly, when the WSS steers channels 2 and 4 to node 16-1, that node 16-1 passes and demultiplexes those channels to the client nodes connected thereto. Likewise, when the WSS steers channels 1 and 3 to node 16-2, that node 16-2 passes and demultiplexes those channels to the client nodes connected thereto.

Configured to account for the imperfect nature of the nodes 16 in the rings 14 to pass and demultiplex all channels in the usable band, the WSS steers other wavelength channels to other access subnetworks 14. Specifically, the WSS steers wavelength channels 5, 8, 15, and 20 to Bus #1. Access subnetwork nodes 16 forming this bus simply employ different variants of filter 32 (or no filter at all for channel 8) to receive the wavelength channels 5, 15, and 20. No demultiplexing is necessary in this case because the nodes 16 are steered only a single channel. Conversely, the WSS steers wavelength channels 6, 7, 9, and 12 to Tree #1, and steers channels 17-19 to Tree #2. The single nodes 16 shown as forming these respective trees simply employ a 2:4 cyclic AWG to demultiplex the channels to which it is steered.

Figure 15:
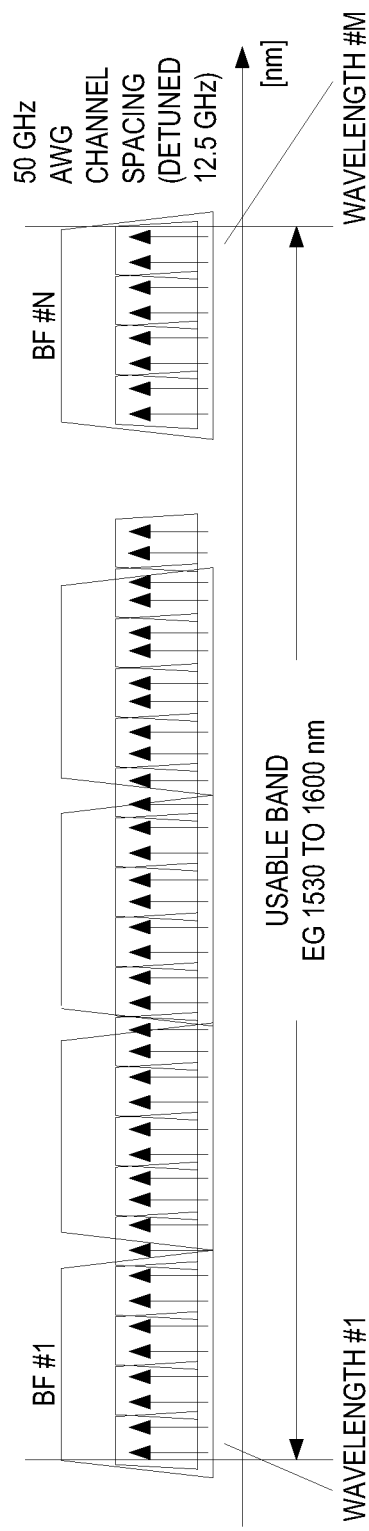
FIG. 15 illustrates an example of a wavelength plan for an access network, according to one or more other embodiments.

Those skilled in the art will appreciate of course that, while the above embodiments illustrated the AWG spacing as being the same as the wavelength spacing, the present invention is not limited in this respect. FIG. 15, for example, illustrates one embodiment where the AWG spacing is a multiple of the wavelength spacing. As shown in FIG. 5, the AWG spacing is twice that of the wavelength spacing, i.e., 50 GHz instead of 25 GHz, meaning that the AWG 34 has 4 ports instead of 8 as shown in FIG. 12. Configured in this way, the AWG 34, for each of the multiplexed ports, maps different subsets of multiple wavelength channels at that multiplexed port to different demultiplexed ports. The AWG 34 for instance demultiplexes four wavelength channels to demultiplexed port D1 instead of just two channels. As compared to FIGS. 12 and 14, for example, the AWG 34 with 50 GHz AWG channel spacing is detuned to 12.5 GHz and thus demultiplexes not only λ1 and λ8 to D1, but also demultiplexes λ2 and λ7 to D1. Because of this, the CO 24 in these embodiments is configured to selectively steer only either λ1 or λ2, and only either λ7 or λ8, to any given access subnetwork node 16.

These embodiments require slightly better wavelength stability than other embodiments, but nonetheless prove advantageous in at least some cases because they relax the requirements on and expense associated with the AWG 34. Moreover, the embodiments allow for client node transmitters (e.g., tunable lasers) that are not capable of narrow channel spacing. Finally, the embodiments reduce the filter narrowing effect of cascading filter 32, AWG 34, and one or more WSSs at the CO 24.

Those skilled in the art will appreciate that no particular type of technology is required to implement these one or more WSSs employed by the above embodiments. Indeed, WSSs herein may be realized using array waveguide gratings (AWGs), microelectromechanical systems (MEMs), liquid crystal on silicon (LCoS), or any other technology that may permit selective switching of optical signals on a per-wavelength basis.

Still further, those skilled in the art will understand that no particular type of WDM is required to practice the above embodiments. Thus, the embodiments may employ coarse WDM or dense WDM. The embodiments may even be used in the context of a WDM passive optical network (WDM-PON), with or without inverse return to zero/return to zero (IRZ/RZ) wavelength re-use. In one embodiment, for instance, the embodiments utilize 25 GHz channel spacing in both C and L bands, allowing for up to 360 wavelength channels per fiber, assuming the 9 THz spectrum resulting from the 1530-1600 nm band indicated in FIGS. 12 and 15. Another embodiment utilizes up to 100 GHz channel spacing.

Figure 16:
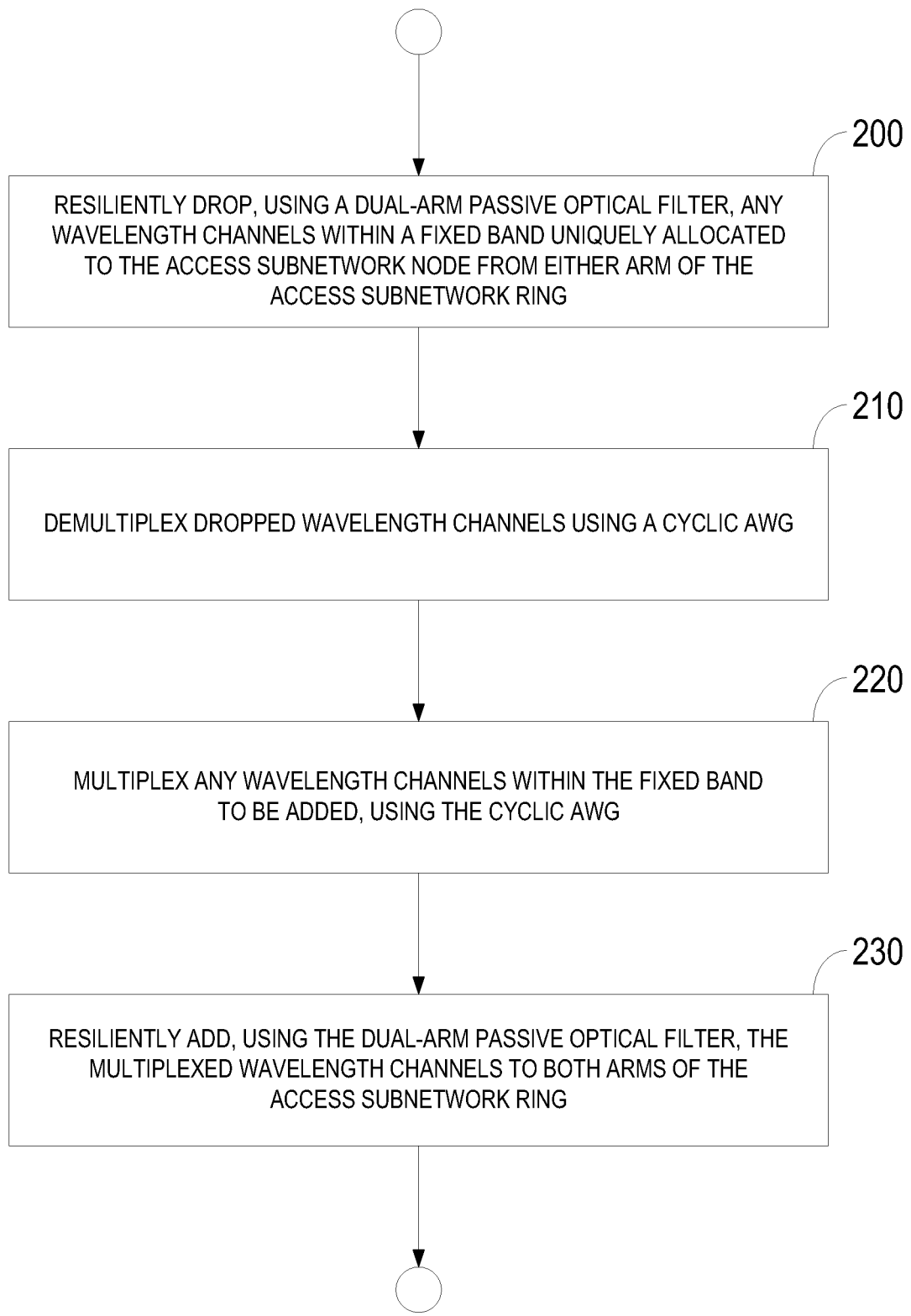
FIG. 16 is a logic flow diagram of processing performed by a resilient add-drop module according to one or more embodiments.

In view of the above modifications and variations, those skilled in the art will appreciate that a resilient add-drop module 30 in an access subnetwork node 16 herein generally performs the processing shown in FIG. 16. As shown in FIG. 16, processing includes resiliently dropping, using a dual-arm passive optical filter 32, any wavelength channels within a fixed band uniquely allocated to the access subnetwork node 16 from either arm of the access subnetwork ring 36 (Block 200). Processing further includes demultiplexing dropped wavelength channels using a cyclic AWG 34 (Block 210), as well as multiplexing any wavelength channels within the fixed band to be added, using the cyclic AWG 34 (Block 220). Finally, processing also entails resiliently adding, using the dual-arm passive optical filter 32, the multiplexed wavelength channels to both arms of the access subnetwork ring 36 (Block 230).

Thus, those skilled in the art will recognize that the present invention may be carried out in other ways than those specifically set forth herein without departing from essential characteristics of the invention. The present embodiments are thus to be considered in all respects as illustrative and not restrictive, and all changes coming within the meaning and equivalency range of the appended claims are intended to be embraced therein.

What is claimed is:

1. A resilient add-drop module for use in one of multiple access subnetwork nodes forming an access subnetwork ring, comprising:
   a dual-arm passive optical filter configured to resiliently drop any wavelength channels within a fixed band uniquely allocated to the access subnetwork node from either arm of the access subnetwork ring and to resiliently add any wavelength channels within the fixed band to both arms of the access subnetwork ring; and
   a cyclic arrayed waveguide grating (AWG) configured to demultiplex wavelength channels dropped by the dual-arm filter and to multiplex wavelength channels to be added by the dual-arm filter, wherein the dual-arm filter comprises a 4-port bandpass filter having two ports connected to different arms of the access subnetwork ring and two ports connected to the cyclic AWG via zero or more passive directional couplers.

2. The module of claim 1, wherein the 4-port bandpass filter comprises a dual-fiber collimator on each side of a thin film filter.

3. The module of claim 1, wherein the 4-port bandpass filter comprises two 3-port bandpass filters, wherein each 3-port bandpass filter comprises a dual-fiber collimator on one side of a thin film filter and a single-fiber collimator on the other side of the thin film filter, and wherein the single-fiber collimators of the two 3-port bandpass filters are connected together.

4. A resilient add-drop module for use in one of multiple access subnetwork nodes forming an access subnetwork ring, comprising:
   a dual-arm passive optical filter configured to resiliently drop any wavelength channels within a fixed band uniquely allocated to the access subnetwork node from either arm of the access subnetwork ring and to resiliently add any wavelength channels within the fixed band to both arms of the access subnetwork ring; and
   a cyclic arrayed waveguide grating (AWG) configured to demultiplex wavelength channels dropped by the dual-arm filter and to multiplex wavelength channels to be added by the dual-arm filter, wherein the cyclic AWG has two multiplexed ports, and wherein the dual-arm filter is configured to:

drop wavelength channels from different arms of the access subnetwork ring to different multiplexed ports of the cyclic AWG; and add wavelength channels from different multiplexed ports of the cyclic AGW to different arms of the access subnetwork ring.

5. The module of claim 4, wherein the cyclic AWG has a plurality of demultiplexed ports, and wherein the cyclic AWG maps wavelength channels at a first one of the multiplexed ports to the demultiplexed ports differently than it maps wavelength channels at a second one of the multiplexed ports to the demultiplexed ports.

6. The module of claim 5, further comprising one or more passive directional couplers that are connected to one or more respective pairs of demultiplexed ports, wherein the cyclic AWG maps the same wavelength channel at different multiplexed ports to different demultiplexed ports in any given pair.

7. The module of claim 6, wherein each passive directional coupler has two ports connected to said pair of demultiplexed ports and two ports connected respectively to a transmitter and receiver of a client node.

8. The module of claim 5, wherein, for each of the multiplexed ports, the cyclic AWG maps different subsets of multiple wavelength channels at that multiplexed port to different demultiplexed ports.

9. A method implemented by a resilient add-drop module in one of multiple access subnetwork nodes forming an access subnetwork ring, comprising:

resiliently dropping, using a dual-arm passive optical filter, any wavelength channels within a fixed band uniquely allocated to the access subnetwork node from either arm of the access subnetwork ring;

demultiplexing dropped wavelength channels using a cyclic arrayed waveguide grating (AWG);

multiplexing any wavelength channels within the fixed band to be added, using the cyclic AWG; and resiliently adding, using the dual-arm passive optical filter, the multiplexed wavelength channels to both arms of the access subnetwork ring, wherein the dual-arm filter comprises a 4-port bandpass filter and wherein said dropping comprises receiving wavelength channels from different arms of the access subnetwork ring at two different ports of the 4-port bandpass filter and outputting those received wavelength channels at two different ports connected to the cyclic AWG via zero or more passive directional couplers.

10. The method of claim 9, wherein the 4-port bandpass filter comprises a dual-fiber collimator on each side of a thin film filter.

11. The method of claim 9, wherein the 4-port bandpass filter comprises two 3-port bandpass filters, wherein each 3-port bandpass filter comprises a dual-fiber collimator on one side of a thin film filter and a single-fiber collimator on the other side of the thin film filter, and wherein the single-fiber collimators of the two 3-port bandpass filters are connected together.

12. A method implemented by a resilient add-drop module in one of multiple access subnetwork nodes forming an access subnetwork ring, comprising:

resiliently dropping, using a dual-arm passive optical filter, any wavelength channels within a fixed band uniquely allocated to the access subnetwork node from either arm of the access subnetwork ring;

demultiplexing dropped wavelength channels using a cyclic arrayed waveguide grating (AWG);

multiplexing any wavelength channels within the fixed band to be added, using the cyclic AWG; and resiliently adding, using the dual-arm passive optical filter, the multiplexed wavelength channels to both arms of the access subnetwork ring, wherein the cyclic AWG has two multiplexed ports, and wherein the method further comprises:

dropping wavelength channels from different arms of the access subnetwork ring to different multiplexed ports of the cyclic AWG; and adding wavelength channels from different multiplexed ports of the cyclic AGW to different arms of the access subnetwork ring.

13. The method of claim 12, wherein the cyclic AWG has a plurality of demultiplexed ports, and wherein said demultiplexing and multiplexing comprises mapping wavelength channels at a first one of the multiplexed ports to the demultiplexed ports differently than mapping wavelength channels at a second one of the multiplexed ports to the demultiplexed ports.

14. The method of claim 13, further comprising connecting one or more respective pairs of demultiplexed ports using one or more passive directional couplers, and wherein said demultiplexing and multiplexing comprises mapping the same wavelength channel at different multiplexed ports to different demultiplexed ports in any given pair.

15. The method of claim 14, wherein said connecting comprises connecting two ports of any given passive directional coupler to the associated pair of demultiplexed ports and two other ports of that passive directional coupler respectively to a transmitter and receiver of a client node.

16. The method of claim 13, wherein said demultiplexing and multiplexing comprises, for each of the multiplexed ports, mapping different subsets of multiple wavelength channels at that multiplexed port to different demultiplexed ports.

* * * * *

UNITED STATES PATENT AND TRADEMARK OFFICE
CERTIFICATE OF CORRECTION

PATENT NO. : 8,929,738 B2  
APPLICATION NO. : 13/484115  
DATED : January 6, 2015  
INVENTOR(S) : Dahlfort et al.

It is certified that error appears in the above-identified patent and that said Letters Patent is hereby corrected as shown below:

IN THE SPECIFICATION

In Column 4, Line 16, delete "network 20" and insert -- network 22 --, therefor.

In Column 7, Line 4, delete "AWG 30" and insert -- AWG 34 --, therefor.

In Column 7, Line 65, delete "$P_m$" and insert -- $P_{\lambda 1}$ --, therefor.

Signed and Sealed this  
Sixteenth Day of February, 2016

Michelle K. Lee  
*Director of the United States Patent and Trademark Office*